United States Patent

Zeffer et al.

[15] 3,642,291
[45] Feb. 15, 1972

[54] INFLATABLE SEAL

[72] Inventors: Arthur A. Zeffer, Wadsworth; Harry R. Weaver, Cuyahoga Falls, both of Ohio

[73] Assignee: The B. F. Goodrich Company, New York, N.Y.

[22] Filed: May 18, 1970

[21] Appl. No.: 38,236

[52] U.S. Cl............................................277/34, 277/218
[51] Int. Cl...............................................F16j 15/46
[58] Field of Search.....................277/34, 34.3, 218, 226; 49/477

[56] References Cited

UNITED STATES PATENTS

| 505,703 | 9/1893 | Dodge | 277/218 |
| 2,943,874 | 7/1960 | Valdi et al. | 277/34.3 |
| 2,720,011 | 10/1955 | Krupp | 277/34 |
| 3,491,825 | 1/1970 | Peterson | 277/34.3 |
| 943,023 | 12/1909 | Johnson | 277/34 |

*Primary Examiner*—Robert G. Nilson
*Attorney*—John D. Haney and Harold S. Meyer

[57] ABSTRACT

An annular, inflatable tube for installation between inner and outer members having a joint at which the tube can be split for installation around the inner member where it is difficult to slide a seal over the member. The ends of the tube are closed and beveled to overlap. A stretchable sleeve fits over the ends of the tube at the joint and has circumferential ribs inside the sleeve for engagement with circumferential grooves in the end portions of the tube. Reinforcing cords in the tube wall and in the sleeve are arranged so as to control expansion for sealing the space between the inner and outer members without increasing or decreasing the length of the tube.

15 Claims, 7 Drawing Figures

INVENTORS
ARTHUR A. ZEFFER
HARRY R. WEAVER
BY John D. Haney
ATTY.

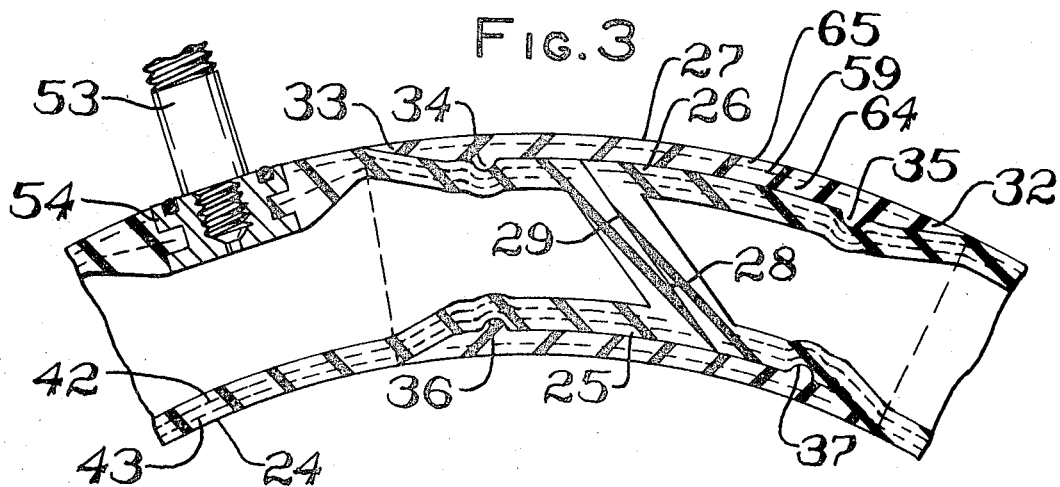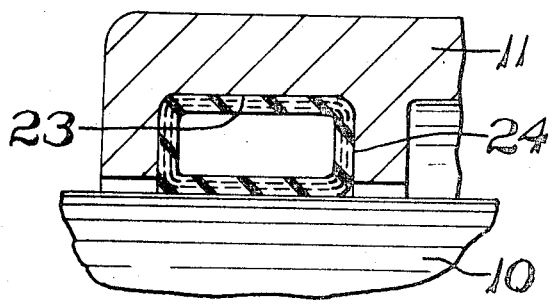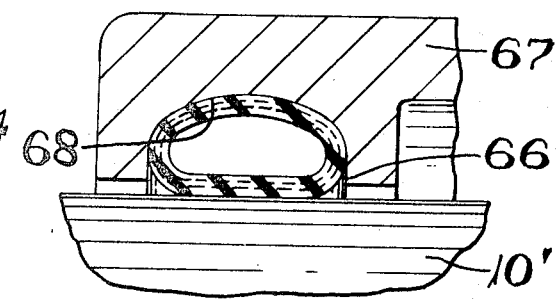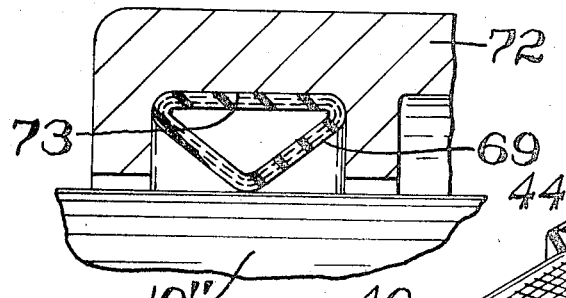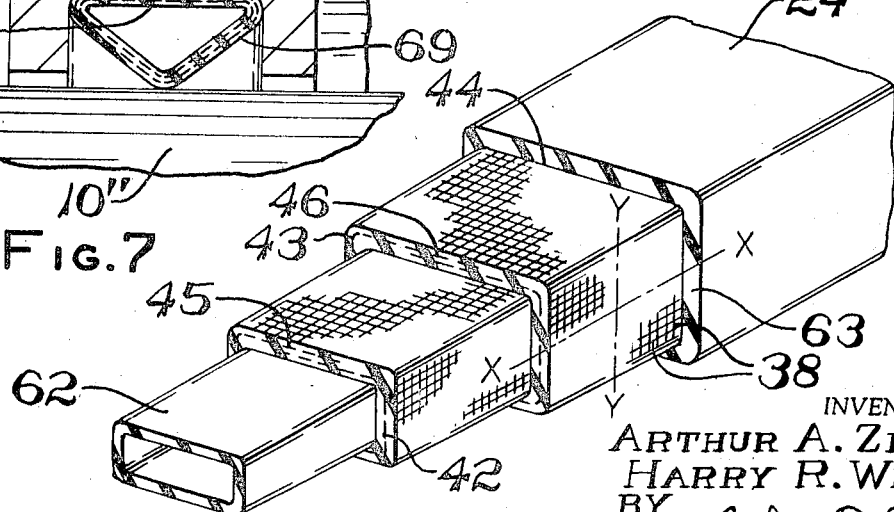

INFLATABLE SEAL

BACKGROUND OF THE INVENTION

This invention relates to an inflatable seal of the type which may be installed around the propeller or stabilizer shafts of a ship at a point along the shafts. Seals of this type are necessary to deter or stop the flow of water into certain compartments of a ship so that repairs and maintenance operations such as the replacement of bearings can be carried out without placing the ship in dry dock.

Heretofore, the inflatable seals have consisted of semicircular tubes of rubber which would be placed around a shaft and then the abutting ends would be connected by rubber dowels. Portable vulcanizing apparatus was then placed around the joints and the two halves of the tube were bonded together at the abutting end faces. The normal time necessary to install a seal of this type was from 8 to 24 hours during which time the shaft could not be rotated and this lost time has resulted in a substantial cost to operators of freight and passenger-carrying vessels. This lost time could be even more critical for a Navy combat ship.

It was found that with this type of inflatable seal the joined portions did not expand in the same manner as the rest of the seal and the space between the seal and the shaft at the joined portions had to be packed with oakum or other sealing material to reduce the leakage which sometimes reached a flow of from 40 to 50 gallons per minute. In addition, this type of seal could not be removed and used again since the ends were vulcanized together and could not be separated without permanently damaging the sealing tube. These tubes were made of rubber gum without any cord or fabric reinforcement and as a result the expansion was not controlled causing excessive surface contact with the shaft at some points and insufficient surface contact at other points. It is evident from the above discussion of the construction of this type of inflatable seal which was accepted as standard equipment for many years that a need existed for a seal which could be readily installed and removed and which would provide improved sealing action around the shaft.

SUMMARY OF THE INVENTION

The inflatable seal of this invention can be installed in approximately 15 minutes and may be removed and reused without damaging the seal. No special equipment is needed to install the seal and when inflated the entire seal including the joined portion expands into sealing engagement with the shaft in a controlled manner.

Control of the expansion is provided through the use of reinforcing cords which are disposed in the body of the tubular seal to permit expansion, but at the same time retain substantially the same length so that the ends do not buckle or pull apart at the joint. The sleeve around the abutting ends also has cord reinforcement of a similar type to control expansion of the joined portion. Overlapping hollow beveled ends of the sealing tube provide for expansion of the joined portion to produce an effective seal with the shaft at that part of the seal. The sleeve and end portions have intermeshing ribs and grooves and are further locked in upon expansion of the end portions. In addition, metal spuds for attaching the outer diameter of the seal to a housing may be embedded and vulcanized in the radially outer portion of the seal where the fabric of reinforcing cords is lap spliced. This spliced section provides a heavier section for attachment of the spuds and at the same time limits the expansion of the outer diameter of the seal as compared with the expansion or growth of the inner diameter into sealing engagement with the shaft.

The accompanying drawings show one preferred form and two modifications of an inflatable seal made in accordance with and embodying this invention and which is representative of how this invention may be practiced.

BRIEF DESCRIPTION OF THE DRAWINGS

In the drawings:

FIG. 3 is an enlarged fragmentary sectional view of the sealing tube at the joined portion showing the overlapping ends and the beveled faces.

FIG. 4 is a fragmentary view in perspective of a cutaway portion of the sealing tube showing the reinforcing cord fabric construction.

FIG. 5 is an enlarged fragmentary sectional view taken along the line 5—5 of FIG. 1 showing the sealing tube in the inflated condition in sealing engagement with the shaft.

FIG. 6 is a fragmentary sectional view like FIG. 5 of a sealing tube having a circular cross section.

FIG. 7 is a fragmentary sectional view like FIG. 5 showing a sealing tube having a triangular cross section.

DETAILED DESCRIPTION

Figure 1:
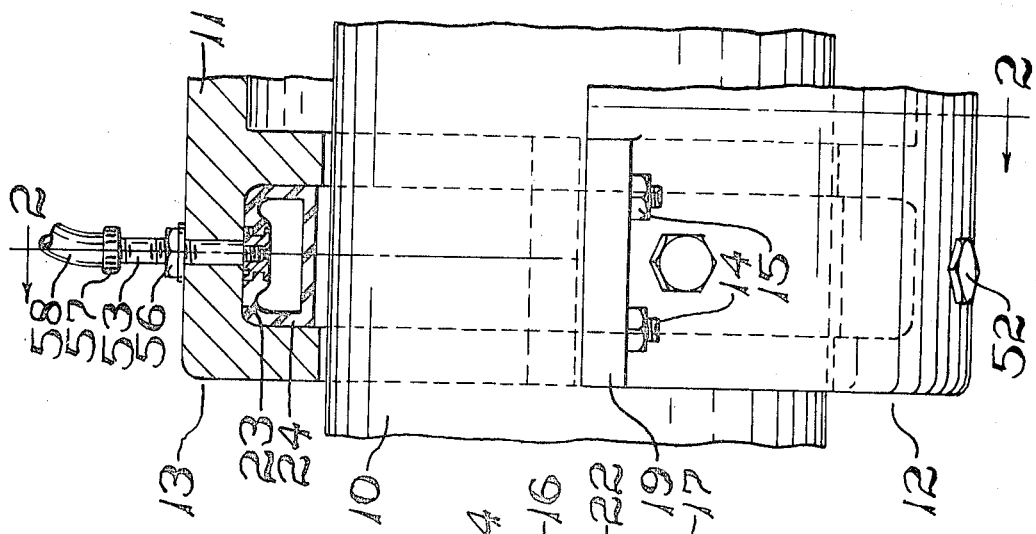
FIG. 1 is a fragmentary half sectional view of a shaft seal assembly showing the seal in the retracted, deflated condition.
Figure 2:
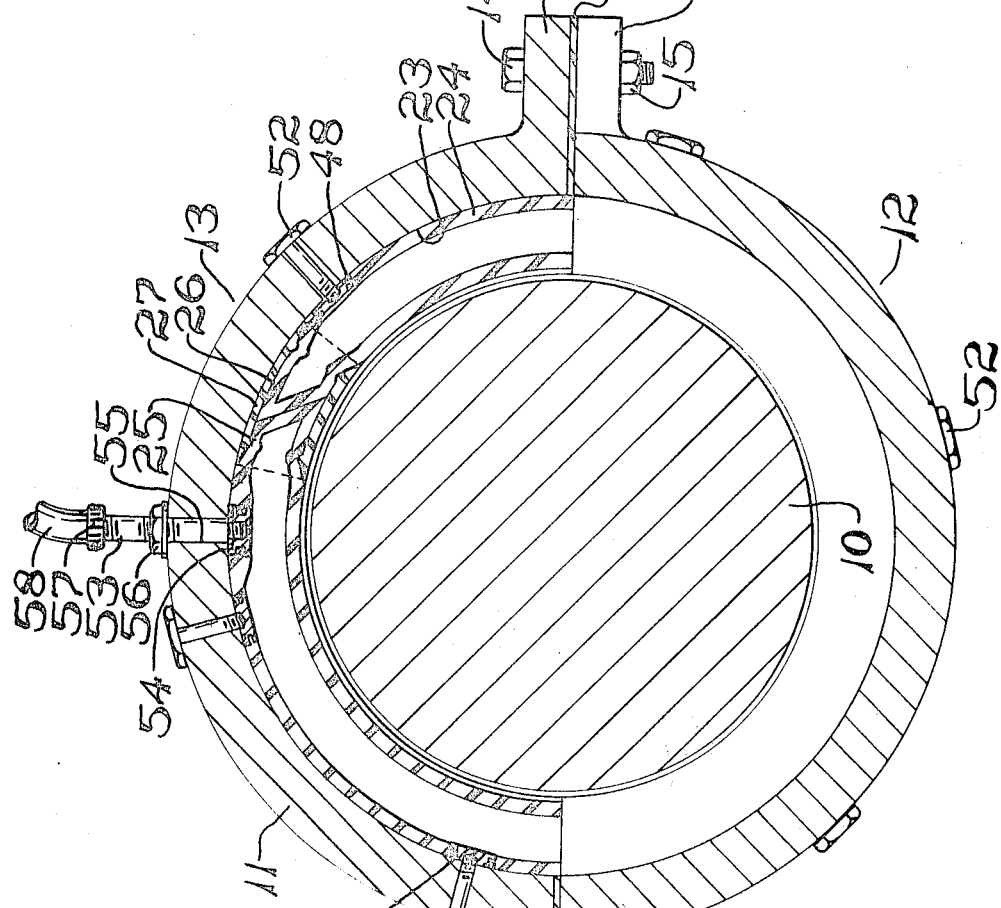
FIG. 2 is a sectional view taken along the plane of line 2—2 of FIG. 1.

Referring to FIGS. 1 and 2, a sealing assembly is shown in which a shaft 10 such as a propeller shaft or stabilizer shaft for a ship, is surrounded by a housing 11 attached to a watertight bulkhead of the ship (not shown). The housing 11 has a lower section 12 permanently attached to the bulkhead of the vessel and an upper removable section 13 which is fastened to the lower section 12 by bolts 14 and nuts 15 for urging flanges 16, 17, 18 and 19 on the sections 12 and 13 together in sealing engagement. Gaskets 22 may be placed between the lower section 12 and upper removable section 13 to prevent leakage therebetween.

The housing 11 which may be of steel or other high-strength material has a channel 23 extending circumferentially around the radially inner face of the lower section 12 and upper removable section 13 for receiving an inflatable seal such as an annular tubular body 24. As shown in FIGS. 1 and 2, the tubular body 24 has a substantially rectangular cross section in the retracted, deflated condition. The tubular body 24 is preferably of resilient elastomeric material such as rubber and has abutting end portions 25 and 26 which are held in a sleeve 27 of resilient elastomeric material providing a continuous smooth surface for engaging the shaft 10.

As shown more clearly in FIG. 3, the joint between the end portions 25 and 26 has beveled faces 28 and 29 providing an overlapping of the hollow end portions 25 and 26. The outer dimensions of the end portions 25 and 26 are reduced so that the sleeve 27 which has the same outer dimensions as the tubular body 24 will present a smooth surface for engagement with the shaft 10. The edges 32 and 33 of the sleeve 27 are tapered to provide a smooth outer surface of the tubular body 24 at the joined portion. Circumferential ribs 34 and 35 are molded in the inner face of the sleeve 27 for intermeshing engagement with grooves 36 and 37 molded in the end portions 25 and 26 of the tubular body 24 to hold the end portions together with the beveled faces 28 and 29 in abutting relationship.

Reinforcing cords are embedded in and adhered to the resilient elastomeric material of the tubular body 24 and sleeve 27 in a configuration which permits expansion into sealing engagement with the shaft 10 while at the same time maintaining substantially the same length of the tubular body from end portion 25 to end portion 26. In the present embodiment as shown more clearly in FIG. 4, stretch cords 38 which have a core of resilient elastomeric material and are wrapped in strands of textile material are used in square woven fabric. An inner layer of fabric 42 and an outer layer 43 are wrapped around the tubular body 24 with the stretch cords 38 extending in the longitudinal direction indicated by coordinates X—X and in the transverse direction indicated by coordinates Y—Y shown in FIG. 4. The edges of the fabric layers 42 and 43 are overlapped in the radially outer portion 44 of the tubular body 24 providing lap splices 45 and 46. The increased reinforcement of the radially outer portion 44 due to the lap splices 45 and 46 also improves the connection of mounting elements such as spuds 48 to the tubular body 24 in the radially outer portion 44. The spuds 48 contain threaded openings for receiving threaded fasteners such as screws 52 extending through the wall of the housing 11 and in threaded engagement with the spuds to hold the tubular body 24 in position during rotation of the shaft.

An inflation passage for the tubular body 24 includes a tubular member 53 in threaded engagement with a hollow inflation spud 54 mounted in the radially outer portion 44 in the area where the lapped splices 45 and 46 provide extra reinforcement. The tubular member 53 extends outward through an opening 55 in the wall of the housing 11 and may be held in position by a nut 56 threaded over the projecting portion of the tubular member and bearing against the outer wall of the housing 11. This tubular member 53 may be attached by a coupling 57 to a conduit 58 which may be connected to a suitable source of air pressure for inflating the tubular body 24.

In the present embodiment the sleeve has a construction similar to that shown for the tubular body 24 in FIG. 4; however, only one layer of fabric 59 is embedded in and adhered to the resilient elastomeric material of the sleeve.

In the fabrication of the tubular body 24, an inner layer of gum 62 is laid around a curved mandrel having a spiral shape and a diameter equal to the diameter of the shaft on which the finished tubular body 24 is to be used. The inner layer of fabric 42 is then laid around the layer of gum 62 after which the outer layer of fabric 43 is laid around the inner layer and with the lap splices 45 and 46 being made in the radially outer position 44. Finally an outer layer of gum 63 is laid around the outer layer of fabric 43 and the tubular body is slipped off of the mandrel so that the end portions 25 and 26 may be built on the ends of the tubular body 24. During the building the spuds 48 and hollow inflation spud 54 are built into the radially outer portion 44 of the tubular body 24. The tubular body 24 is then vulcanized in the shape as shown in FIG. 1 and FIG. 2.

The sleeve 27 is also built on a curved mandrel with the fabric layer 59 being wrapped around an inner layer of gum 64 with the lap splice in the radially outer portion and an outer layer of gum 65 being wrapped around the layer of fabric. The fabricated sleeve 27 is then removed from the curved mandrel and cured in the curved condition as shown in FIG. 3.

A ship would usually be built with the housing 11 but without the tubular body 24 installed. When a seal is needed the upper removable section 13 of the housing 11 can be removed by screwing the nuts 15 off bolts 14 and removing the upper section. The end portions 25 and 26 of the tubular body 24 can then be pulled out of the sleeve 27 and one end fed into the channel 23 of the lower section 12. It is understood that this may be done while the shaft 10 is within the housing 11. After the tubular body 24 is fed around the shaft 10 the end portions 25 and 26 may be snapped into the sleeve 27. The tubular member 55 can then be aligned with the opening 55 in the upper removable section 13 of the housing 11 which automatically aligns the spuds 48 with the housing openings for screws 52 which may be screwed into the spuds around the outer periphery of the housing. Bolts 14 and nuts 15 may be screwed together to bring the flanges 16, 17, 18 and 19 together against the gasket 22 and provide a sealed housing 11 for retaining the annular tubular body 24. A conduit 58 may then be connected to the tubular member 55 by coupling 57 and air pressure directed into the tubular body 24 causing the radially inner portion to expand into engagement with the shaft 10 as shown in FIG. 5. At the joined portion, air pressure within the end portions 25 and 26 will cause them to expand into the sleeve 27 which in turn will expand at the radially inner portion into engagement with the shaft 10. During expansion the end portions 25 and 26 will remain in engagement with the beveled faces 28 and 29 in abutting relationship. This is due to the configuration of the cords and, specifically in this embodiment, to the interaction of the stretch cords 38 which permits expansion but does not decrease or increase the length of the tubular body 24.

It is understood that reinforcing cords which do not stretch may also be used by placing them at the proper angles to provide for the expansion without shortening or lengthening of the tubular body. It is also understood that the number of layers of fabric may be increased for certain applications and may be decreased to one layer for other applications without departing from the concept of this invention. The fabric layers may also be wrapped in a continuous manner around the tubular body and still provide expansion and contraction without change in length in accordance with the invention.

Referring to FIG. 6, a modification of the annular tubular body 24 is shown in which a tubular body 66 having a circular cross section is shown mounted in a housing 67 having a channel 68 with a semicircular cross section for receiving the tubular body 66. This circular cross section tubular body 66 when inflated, as shown in FIG. 6, expands into engagement with the shaft 10' in a manner similar to the expansion of the tubular body 24 to provide a sealing assembly.

Another modification of the invention is shown in FIG. 7 where a tubular body 69 having a triangular cross section is mounted in a housing 72 having a cavity 73. As shown in FIG. 7, the tubular body 69 expands into sealing engagement with the shaft 10'' upon inflation in much the same manner as the tubular body 24 expands to engage the shaft 10.

We claim:

1. An inflatable seal comprising an annular tubular body of resilient elastomeric material, said tubular body having a stretchable wall, means for inflating said body to stretch said wall and change the diameter of said body, a joint in said body providing abutting end portions, a sleeve of resilient elastomeric material disposed around said end portions for holding them together and expanding with them as they are inflated, and said sleeve being stretchable with said wall to simultaneously change the diameter of said sleeve and said tubular body whereby a continuous sealing surface is provided around said body.

2. An inflatable seal according to claim 1 wherein the faces of said end portions are beveled to provide overlapping, inflatable end portions.

3. An inflatable seal according to claim 1 wherein reinforcing cords extend around said body and are embedded in and adhered to the elastomeric material of said body for controlling the expansion thereof.

4. An inflatable seal according to claim 3 wherein said reinforcing cords are disposed to permit expansion without appreciably increasing or decreasing the length of said body between said end portions.

5. An inflatable seal according to claim 4 wherein said reinforcing cords are stretch cords having a core of elastomeric material wrapped in strands of textile material and said cords are woven into a fabric.

6. An inflatable seal according to claim 5 wherein said fabric is square woven and laid around said body with the cords extending substantially longitudinally and transversely of said body.

7. An inflatable seal according to claim 4 wherein said fabric edges are lap spliced with the splice being located in the radially outer portion of said body.

8. An inflatable seal according to claim 7 wherein mounting elements are secured to said body in the radially outer portion where the maximum thickness of reinforcing cords are located in said splices.

9. An inflatable seal according to claim 3 wherein reinforcing cords are embedded in and adhered to the elastomeric material of said sleeve for expansion with the end portions as the other portions of said body expand.

10. An inflatable seal according to claim 9 wherein said end portions are beveled to provide overlapping hollow end faces whereby expansion along the length of said joint will take place upon inflation of said body.

11. A sealing assembly for a rotatable shaft comprising a housing extending around and spaced from the shaft, an annular tubular body of elastomeric material interposed between said housing and the shaft, said body having a stretchable wall and a joint providing abutting end portions, a sleeve of resilient elastomeric material disposed around said end portions for holding them together and expanding with them as they are inflated, said body being inflatable and having a passage for the supplying of inflating air, and means for supplying air to said body through said passage to inflate said body and stretch said wall whereby the radially inner portion of said body and said sleeve will simultaneously be moved into sealing engagement with the shaft.

12. A sealing assembly according to claim 11 wherein said annular body has reinforcing cords embedded in and adhered to the elastomeric material of said body, said reinforcing cords being woven in a fabric laid around said body and lap spliced at the radially outer face thereof and mounting elements secured to said body at said radially outer portion for receiving fasteners extending from said housing to hold said body within said housing.

13. An inflatable seal comprising an annular tubular body of resilient elastomeric material, a joint in said body providing abutting end portions, a sleeve of resilient elastomeric material disposed around said end portions for holding them together and expanding with them as they are inflated, said end portions having a reduced cross section to compensate for the thickness of said sleeve so that the outer dimensions of the seal at said joint will be substantially the same as the outer dimensions of other portions of the tubular body.

14. An inflatable seal according to claim 13 wherein said sleeve edges are tapered to provide a smooth surface between said sleeve and the outer face of said body.

15. An inflatable seal comprising an annular tubular body of resilient elastomeric material, a joint in said body providing abutting end portions, a sleeve of resilient elastomeric material disposed around said end portions for holding them together and expanding with them as they are inflated and said end portions and said sleeve having intermeshing, circumferential grooves and ribs for holding said end portions together.

* * * * *